(12) United States Patent
Brunet et al.

(10) Patent No.: US 9,874,980 B2
(45) Date of Patent: Jan. 23, 2018

(54) DYNAMIC CONFIGURATION OF TOUCH SENSOR ELECTRODE CLUSTERS

(71) Applicants: Samuel Brunet, Cowes (GB); Richard Paul Collins, Southampton (GB); Luben Hristov Hristov, Sofia (BG); Steinar Myren, Vikhammer (NO); Trond Jarle Pedersen, Trondheim (NO); Paul Stavely, Southampton (GB)

(72) Inventors: Samuel Brunet, Cowes (GB); Richard Paul Collins, Southampton (GB); Luben Hristov Hristov, Sofia (BG); Steinar Myren, Vikhammer (NO); Trond Jarle Pedersen, Trondheim (NO); Paul Stavely, Southampton (GB)

(73) Assignee: Atmel Corporation, San Jose, CA (US)

( * ) Notice: Subject to any disclaimer, the term of this patent is extended or adjusted under 35 U.S.C. 154(b) by 418 days.

(21) Appl. No.: 14/075,412

(22) Filed: Nov. 8, 2013

(65) Prior Publication Data
US 2015/0035789 A1 Feb. 5, 2015

Related U.S. Application Data

(63) Continuation-in-part of application No. 13/955,352, filed on Jul. 31, 2013.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ...................................................... G06F 3/044
See application file for complete search history.

(56) References Cited

U.S. PATENT DOCUMENTS 7,663,607 B2  2/2010 Hotelling
7,875,814 B2  1/2011 Chen
(Continued)

FOREIGN PATENT DOCUMENTS

WO   WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Jennifer Mehmood
*Assistant Examiner* — Carl Adams
(74) *Attorney, Agent, or Firm* — Baker Botts, L.L.P.

(57) ABSTRACT

An apparatus of one embodiment includes a sensor having a plurality of electrodes and a controller having a processor and a memory. The memory includes logic operable to configure the electrodes to form a first cluster pattern having a plurality of first clusters of two or more electrodes, apply voltage to each first cluster, and determine a plurality of first values associated with a capacitance of a first cluster. The logic is further operable to configure the electrodes to form a second cluster pattern having a plurality of second clusters of two or more electrodes, apply voltage to each second cluster, and determine a plurality of second values associated with a capacitance of a second cluster. At least one second cluster is interleaved with an adjacent second cluster. The logic is further operable to determine a position of an object based at least on the second values.

28 Claims, 10 Drawing Sheets

(56) References Cited

U.S. PATENT DOCUMENTS

| | | |
|---|---|---|
| 7,920,129 B2 | 4/2011 | Hotelling |
| 8,004,499 B2 | 8/2011 | Geaghan |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2009/0255737 A1* | 10/2009 | Chang .................. G06F 3/0418 178/18.06 |
| 2009/0315854 A1 | 12/2009 | Matsuo |
| 2010/0263997 A1* | 10/2010 | Hilgers .................... H01H 1/50 200/181 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0299868 A1* | 11/2012 | Bhagavat ................ G06F 3/044 345/174 |
| 2013/0076612 A1 | 3/2013 | Myers |
| 2013/0181937 A1* | 7/2013 | Chen ...................... G06F 3/044 345/174 |
| 2015/0035789 A1* | 2/2015 | Brunet .................... G06F 3/044 345/174 |

\* cited by examiner

DYNAMIC CONFIGURATION OF TOUCH SENSOR ELECTRODE CLUSTERS

RELATED APPLICATION

This application is a Continuation-In-Part of U.S. application Ser. No. 13/955,352 titled "Dynamic Clustering Of Touch Sensor Electrodes," filed Jul. 31, 2013, by Samuel Brunet et al., the content of which is hereby incorporated by reference.

TECHNICAL FIELD

This disclosure relates generally to touch sensor technology; and more particularly to dynamic configuration of touch sensor electrode clusters.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A controller may process the change in capacitance to determine its position on the touch screen.

The drawings included in the Figures are not drawn to scale.

DESCRIPTION OF EXAMPLE EMBODIMENTS

Figure 1:
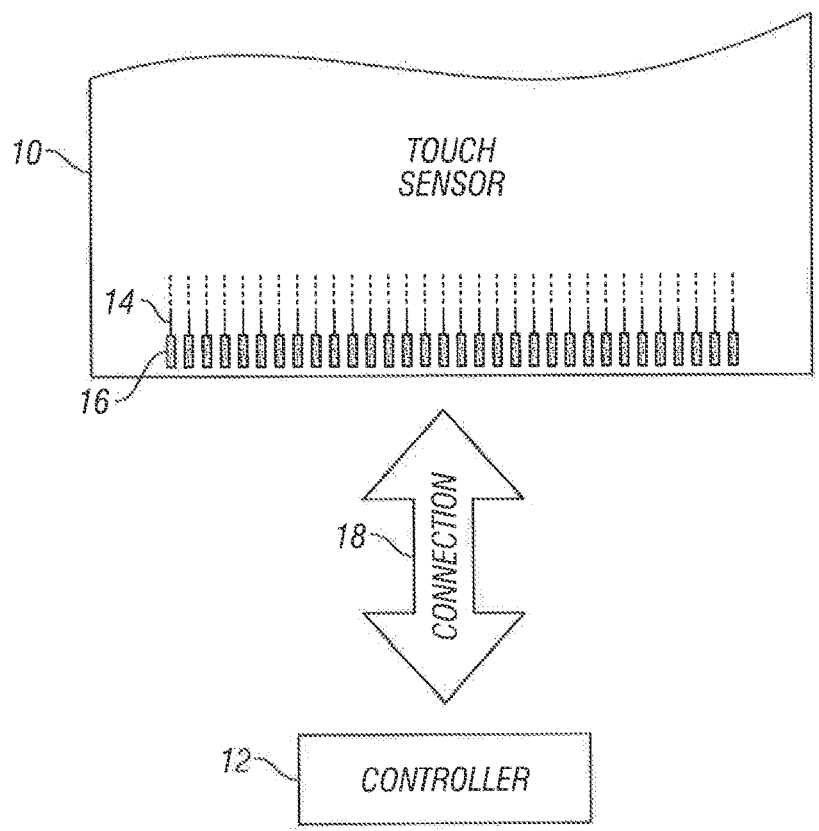
FIG. 1 illustrates an example touch sensor with an example controller that may be used in certain embodiments of the present disclosure.

FIG. 1 illustrates an example touch sensor 10 with an example controller 12, according to certain embodiments of the present disclosure. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on. Alternatively, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates electrodes made of any suitable material.

As used herein, a capacitive node refers to a portion of touch sensor 10 that is configured to provide a distinct capacitive measurement. In various embodiments, capacitive nodes may have different sizes, shapes, and/or configurations. Furthermore, in some embodiments, the size, shape, and other aspects of a capacitive node may be determined by the configuration of controller 12 and may be changed dynamically during the operation of device 2. For example, in some embodiments, multiple tracks 14 may be galvanically connected and sensed together, resulting in a capacitive node spanning multiple electrodes. Furthermore, in some embodiments, such as the embodiment of FIG. 8B, the electrodes of adjacent capacitive nodes may overlap and/or interleave.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. A touch may refer to an external object touching a capacitive node directly or touching a cover or substrate adjacent to the capacitive node. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type that may each form a capacitive node. In such embodiments, a capacitive node may correspond to a single electrode, or a set of multiple connected electrodes, rather than an intersection of tracks 14. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. In some embodiments, this dielectric may be air. Moreover, this disclosure contemplates electrodes disposed on any suitable number of substrates.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs)) of a device that includes touch sensor 10 and controller 12, which may respond to the touch or proximity input by initiating a function of the device (or an application running on the device). Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs), such as for example general-purpose microprocessors, microcontrollers, programmable logic devices or arrays, application-specific ICs (ASICs). In particular embodiments, controller 12 comprises analog circuitry, digital logic, and digital non-volatile memory. In particular embodiments, controller 12 is disposed on a flexible printed circuit (FPC) bonded to the substrate of touch sensor 10, as described below. The FPC may be active or passive, where appropriate. In particular embodiments, multiple controllers 12 are disposed on the FPC. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 m or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, controller 12 may be on an FPC. Connection pads 16 may be made of the same material as tracks 14 and may be bonded to the FPC using an anisotropic conductive film (ACF). Connection 18 may include conductive lines on the FPC coupling controller 12 to connection pads 16, in turn coupling controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between controller 12 and touch sensor 10.

Certain embodiments of touch sensor 10 and controller 12 may measure capacitance or a change in capacitance using any suitable method. For example, voltage may be applied to one or more tracks 14 by opening or closing one or more switches associated with one or more tracks 14. Such switches may connect one or more tracks 14 to other portions of touch sensor 10 or controller 12 such as, for example, a voltage source (e.g. a voltage supply rail), a current source, or any other suitable component. Such methods may cause charge to be transferred to or from one or more portions of one or more tracks 14. In self-capacitance embodiments, the charged one or more tracks 14 may be sensed to measure a value associated with the capacitance of the one or more tracks 14. The presence of an object such as a finger or a stylus may change the amount of charge induced on the sensed track 14, and this change may be measured by controller 12 to determine the position of the object. The position may be a distance between the object and touch sensor 10 (e.g., a hover detection) and/or a projection of a portion of the object onto touch sensor 10 (e.g., a point on touch sensor 10 where the object is touching or hovering). Thus, in an embodiment where the surface of touch sensor 10 lies in the X-Y plane and the Z axis is orthogonal to the X-Y plane, the position may correspond to the X coordinates of the object, Y coordinates, Z coordinates, X-Y coordinates, X-Z coordinates, Y-Z coordinates, X-Y-Z coordinates, any reference position correlating with X, Y, or Z coordinates, or any other suitable position information. In certain embodiments, the same measured values may be used to determine both of the distance between the object and touch sensor 10 and the projection of a portion of the object onto touch sensor 10. Controller 12 may also factor in additional measurements and/or calculations to determine this position. For example, multiple tracks 14 may be sensed synchronously or in close succession, and the position of the object may be determined based on a calculation factoring in each of these measurements. Furthermore, certain embodiments may utilize weighted averages, linear approximation, or any suitable combination thereof to facilitate the determination of the object's position.

Certain embodiments may perform measurements using any suitable number of steps that facilitate capacitance measurements. For example, some embodiments may perform any suitable combination of pre-charging one or more tracks 14, charging one or more tracks 14, transferring charge between two or more tracks 14, discharging one or more tracks 14, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive nodes. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10.

Figure 2:
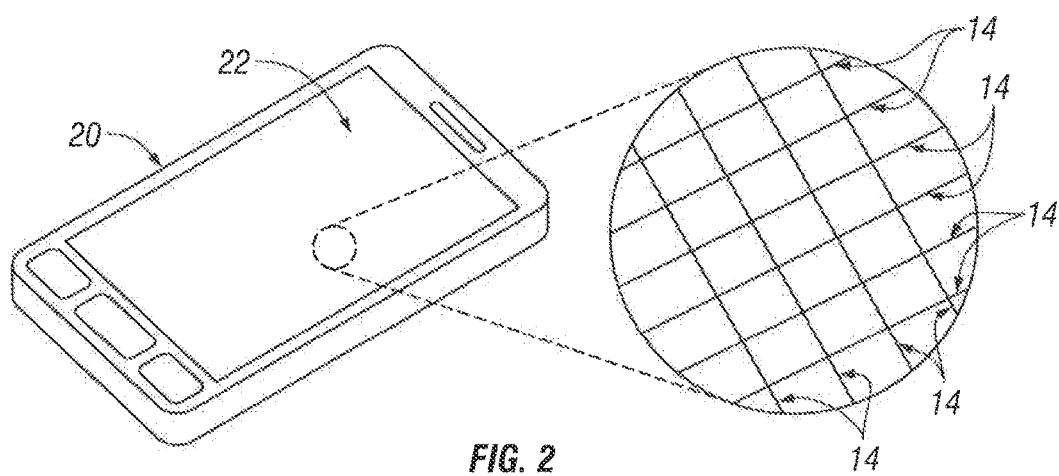
FIG. 2 illustrates an example device and example electrode tracks that may be used in certain embodiments of the present disclosure.

FIG. 2 illustrates an example device 20 and example electrode tracks 14 that may be used in certain embodiments of the present disclosure. In the illustrated embodiment, device 20 includes touch screen 10, which includes tracks 14. In some embodiments, multiple tracks 14 may be connected to form clusters 30 (not shown), which may strengthen the electric field created by tracks 14 to provide improved sensing. Furthermore, to provide improved precision, resolution, and/or linearity when detecting the position of a nearby object, clusters 30 may be interleaved temporally (as shown for example in the embodiments of FIGS. 6A-6B and 7A-7C) and/or spatially (as shown for example in the embodiment of FIG. 8B).

Device 20 may be any touch-sensing device or component. In various embodiments, device 20 may be a smartphone, tablet computer, laptop computer, or any suitable device utilizing a touch sensor 10. Device 20 may include a display 21 that may be overlaid by or otherwise positioned proximate to touch sensor 10. Display 21 and touch sensor 10 may be substantially planar, curved, or have any other suitable configuration.

Tracks 14 may include any structure, configuration, and/or function described above with respect to FIG. 1. While the illustrated embodiment depicts certain tracks 14 running across display 21 perpendicular to certain other tracks 14, other embodiments may use any suitable configuration of tracks 14. For example, certain embodiments of tracks 14 may utilize different shapes, patterns, and/or configurations. Furthermore, certain embodiments may use different types, shapes, or configurations of tracks 14 within the same touch sensor 10. For example, in some embodiments, tracks 14 may be electrode "lines" that may be parallel, perpendicular or have any suitable orientation relative to other tracks 14. In alternative embodiments, which may include certain self-capacitance embodiments, tracks 14 may be non-linear electrodes, rather than intersecting "lines," such that each column and/or row of touch sensor 10 may include multiple tracks 14, each of which is separately connected or connectable to controller 12. In such embodiments, the sensing portion of track 14 may have any suitable shape (e.g., square, round, triangular, hexagonal, or any other suitable shape). Furthermore, such electrodes may be of a single type or multiple types, and each may form a capacitive node. As used herein, track 14 may refer to such electrodes, the track of conductive material connecting the electrode to controller 12, or both, as appropriate.

In self capacitance embodiments, when an object touches or approaches a capacitive node, a change in self-capacitance may occur at the capacitive node and controller 12 may measure the change in capacitance. As a particular example, a change in capacitance may be measured as a change in the amount of charge needed to raise the voltage at the capacitive node by a pre-determined amount. By measuring changes in capacitance throughout the array of electrodes, controller 12 may determine the position of the touch or proximity within the touch-sensitive area(s) of touch sensor 10. Furthermore, multiple tracks 14 may be galvanically connected to form a cluster that can be sensed as a single capacitive node, which may increase the sensitivity of touch sensor 10 and/or reduce noise interference experienced by touch sensor 10. This disclosure contemplates any suitable form of capacitive touch sensing, where appropriate. For example, other embodiments may utilize mutual capacitance sensing.

Figure 3A:
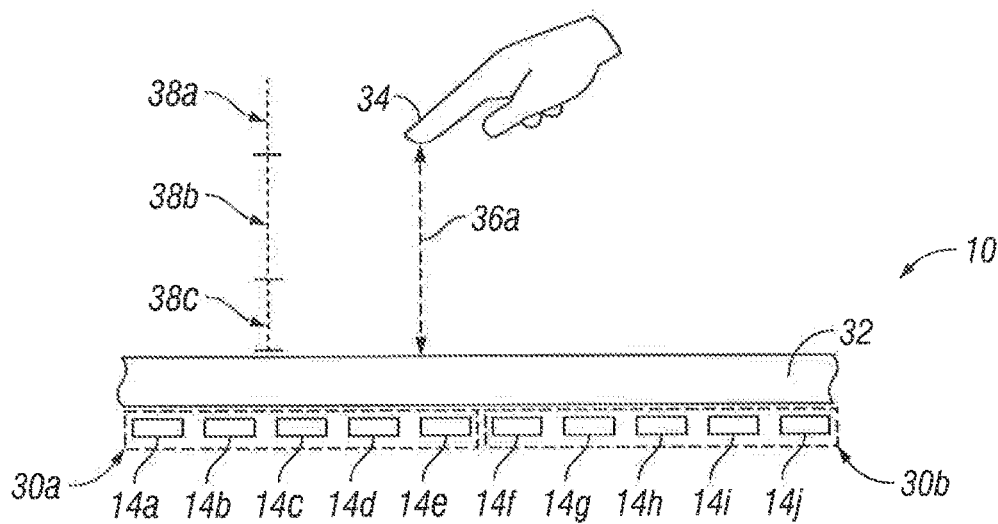
FIG. 3A illustrates an example cluster configuration that may be used in certain embodiments of a touch sensor.

FIG. 3A illustrates an example cluster configuration that may be used in certain embodiments of a touch sensor 10. Touch sensor 10 includes clusters 30a and 30b and panel 32. In the illustrated embodiment, touch sensor 10 may detect the presence and/or position of object 34, which is located a distance 36a from touch sensor 10.

Panel 32 may be any material proximate to tracks 14 and configured to be positioned between tracks 14 and object 34. Panel 32 may be glass, plastic, or any suitable material through which electric fields generated by tracks 14 may interact with object 34. In certain embodiments, panel 32 may be transparent, though this is not required. Panel 32 may be formed as a separate layer from tracks 14, and in such embodiments, panel 32 may be affixed to a portion of touch sensor 10 via an adhesive. In some embodiments, panel 32, tracks 14, and/or one or more substrates may be integrally formed.

Clusters 30a and 30b include tracks 14a-14e and tracks 14f-14j, respectively. As used herein, a "cluster" may refer to a single track 14 or multiple tracks 14 connected such that they can be charged and/or sensed as a single unit. In some embodiments, tracks 14 may be "connected" by galvanically connecting the tracks 14, though any suitable method of connecting tracks 14 may be used (e.g., multiple tracks 14 may be sensed together by capacitively coupling the tracks 14 via a sufficiently large capacitance). Furthermore, the one or more tracks 14 forming a cluster 30 may include any type, structure, and/or configuration discussed above with respect to tracks 14 of FIGS. 1 and 2. For example, certain embodiments may include a cluster 30 of parallel tracks, perpendicular tracks, or both. As another example, certain embodiments may include one or more non-linear self-capacitance electrodes of one or more tracks 14. Thus, clusters 30 may be a set of one or more linear electrode tracks 14, a set of non-linear electrodes, or any suitable configuration of electrodes. As a particular example, the electrodes of cluster 30 may form a triangle, square, hexagon, or other geometric shape from a perspective orthogonal to the surface of touch sensor 10. In some embodiments, a cluster 30 may include all tracks 14 of touch sensor 10. The tracks 14 of a cluster may be adjacent, though this is not required. Furthermore, multiple clusters 30 may be sensed simultaneously or in close succession, which may allow controller to determine the position of object 34 taking into account multiple values. Clusters 30 may include adjacent tracks and/or non-adjacent tracks 14.

In the illustrated embodiment, clusters 30a and 30b each include five galvanically connected electrode tracks 14. In other embodiments, clusters 30 may have more or fewer tracks 14. Such tracks 14 may be galvanically connected by, for example, using various switches of controller 12. Galvanically connecting tracks 14 to form clusters 30 in this manner may increase the sensitivity of touch sensor 10, which may enable detection of the presence and/or position of object 34 at greater distances from touch sensor 10. Such embodiments may also reduce noise interference experienced during the sensing sequence since a stronger signal may be generated relative to the noise effects impacting the measured capacitance values. Galvanically connecting tracks 14 to form clusters 30 may result in improved noise protection compared to touch sensors that sum measurements of the individual tracks 14, because such touch sensors may also effectively sum the noise interference experienced by the tracks 14.

Object 34 may be any external object whose presence and/or position may be detected by touch sensor 10. Object 34 may be a finger, hand, stylus, or any suitable object. In the illustrated embodiment, object 34 is a finger located distance 36a from touch sensor 10. As used herein, a distance from touch sensor 10 may refer to the distance between object 34 and panel 32, tracks 14, or any suitable portion of touch sensor 10.

Ranges 38a-38c may be any suitable ranges corresponding to positions of object 34 that may trigger a change in the configuration of clusters 30, as explained further below. For example, range 38a may be 8-20 mm and may be associated with a cluster size of five tracks 14, range 38b may be 4-10 mm and may be associated with a cluster size of three tracks 14, and range 38c may be 0-5 mm and may be associated with a cluster size of two tracks 14. Other embodiments may use any suitable values for ranges 38. Furthermore, various embodiments may use any number of ranges 38, which may be associated with any suitable cluster size. For example, a particular embodiment may have separate ranges associated with clusters of size 1-10. Furthermore, certain embodiments may not explicitly calculate an estimated distance of object 34 from touch sensor 10. For example, certain embodiments may change cluster configurations based directly on one or more measured capacitance values (rather than using those values to determine distance 36 and then using distance 36 to determine the cluster configuration). Thus, in some embodiments, changes in the configuration of clusters 30 may not directly correspond to the distance of object 34 from touch sensor 10. As a particular example, different objects 34 at the same distance from touch sensor 10 may result in different capacitance values measured by a single cluster 30. As another example, some embodiments may factor in the relative measurements from multiple clusters 30 in determining the appropriate cluster configuration, so different objects 34 (for example, a fingertip vs. a hand) at the same distance from touch sensor 10 and causing the same capacitive measurement at a single cluster 30 may nevertheless trigger different cluster configurations.

In operation, tracks 14a-14e are connected to form cluster 30a, and tracks 14f-14j are connected to form cluster 30b. This connection may be a galvanic connection. Voltage is applied to cluster 30a and 30b, and a capacitance value associated with each cluster 30 is determined using any suitable sensing method described above with respect to FIGS. 1 and 2. Clusters 30a and 30b may be sensed synchronously or sequentially. Based on the measured values, controller 12 may determine a distance between object 34 and touch sensor 10. Based on the measured distance, controller 12 may maintain the same cluster configuration or switch to a different cluster configuration. For example, controller 12 may determine whether the measured distance falls in one or more ranges 38. In the illustrated embodiment, distance 36a falls within range 38a. As object 34 moves to distance 36b from touch sensor 10, controller 12 may determine that object 34 has moved within range 38b and transition to the cluster configuration shown in FIG. 3B. Any suitable cluster configuration and/or range may be used.

Figure 3B:
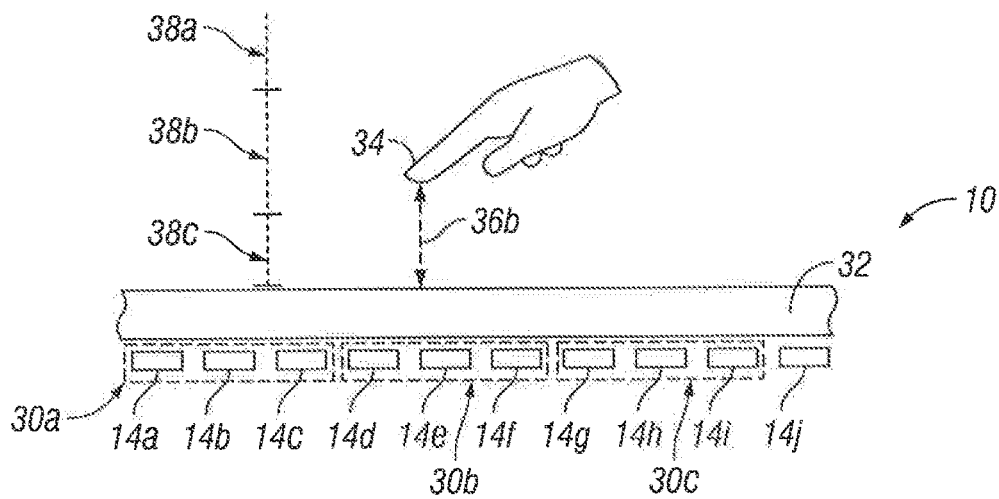
FIG. 3B illustrates an example cluster configuration that may be used in certain embodiments of a touch sensor.

FIG. 3B illustrates an example cluster configuration that may be used in certain embodiments of touch sensor 10. Touch sensor 10 includes clusters 30a, 30b, and 30c and panel 32. In the illustrated embodiment, touch sensor 10 may detect the presence and/or position of object 34, which is located a distance 36b from touch sensor 10.

Clusters 30a, 30b, and 30c include tracks 14a-14c, tracks 14d-14f, and tracks 14g-14i, respectively. Track 14j may be part of an additional cluster 30 that is not shown. In the illustrated embodiment, clusters 30a-30c each include three galvanically connected electrode tracks 14. Such tracks 14 may be galvanically connected by, for example, using various switches of controller 12. Connecting tracks 14 to form clusters 30 in this manner may increase the sensitivity of touch sensor 10, which may enable detection of the presence and/or position of object 34 at greater distances from touch sensor 10. Clusters of three tracks 14 may be more sensitive than clusters of two tracks 14 (see, e.g., FIG. 3C) but less sensitive than clusters of five tracks 14 (see, e.g., FIG. 3A). Certain embodiments may reduce noise interference experienced during the sensing sequence since a stronger signal may be generated relative to the noise effects impacting the measured capacitance values. Connecting tracks 14 to form clusters 30 may result in improved noise protection compared to touch sensors that sum measurements of the individual tracks 14, because such touch sensors may also effectively sum the noise interference experienced by the tracks 14.

Figure 3C:
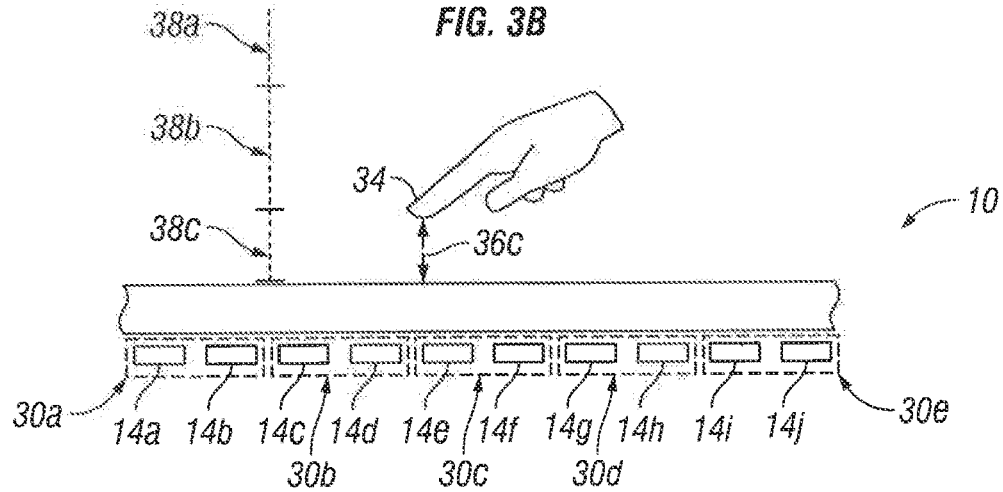
FIG. 3C illustrates an example cluster configuration that may be used in certain embodiments of a touch sensor.

In the illustrated embodiment, object 34 is located distance 36b from touch sensor 10, which falls within range 38b. Controller 12 may configure clusters 30 as shown in FIG. 3B in response to determining that the measured distance 36b falls within range 38b. If the measured distance 36 fell below a threshold value to move within range 38c, controller may configure clusters 30 as shown in FIG. 3C. If the measured distance 36 is increased above a threshold value to move within range 38a, controller may configure clusters 30 as shown in FIG. 3A. Any suitable cluster configuration and/or range may be used.

FIG. 3C illustrates an example cluster configuration that may be used in certain embodiments of a touch sensor. Touch sensor 10 includes clusters 30a-30e and panel 32. In the illustrated embodiment, touch sensor 10 may detect the presence and/or position of object 34, which is located a distance 36c from touch sensor 10.

Clusters 30a-30e include tracks 14a-14b, tracks 14c-14d, tracks 14e-14f, tracks 14g-14h, and tracks 14i-14j, respectively. In the illustrated embodiment, clusters 30a-30e each include two connected electrode tracks 14. Such tracks 14 may be galvanically connected by, for example, using various switches of controller 12. Galvanically connecting tracks 14 to form clusters 30 in this manner may increase the sensitivity of touch sensor 10, which may enable detection of the presence and/or position of object 34 at greater distances from touch sensor 10. Clusters of two tracks 14 may be more sensitive than clusters of a single track 14 (which may correspond to traditional sensing methods) but less sensitive than clusters using a greater number of tracks 14 (see, e.g., FIGS. 3A and 3B). Certain embodiments may reduce noise interference experienced during the sensing sequence since a stronger signal may be generated relative to the noise effects impacting the measured capacitance values. Connecting tracks 14 to form clusters 30 may result in improved noise protection compared to touch sensors that sum measurements of the individual tracks 14, because such touch sensors may also effectively sum the noise interference experienced by the tracks 14.

In the illustrated embodiment, object 34 is located distance 36c from touch sensor 10, which falls within range 38c. Controller 12 may configure clusters 30 as shown in FIG. 3C in response to determining that the measured distance 36c falls within range 38c. If the measured distance 36 is increased to move within range 38b, controller may configure clusters 30 as shown in FIG. 3B. If the measured distance 36 increased to move within range 38a, controller may configure clusters 30 as shown in FIG. 3A. Other embodiments may utilize any suitable ranges and any suitable configuration of clusters 30.

Figure 4A:
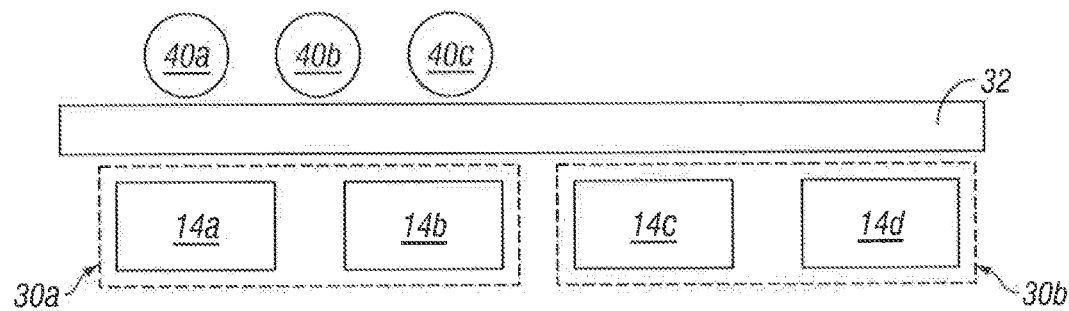
FIG. 4A illustrates example touch points on an example touch sensor.

FIG. 4A illustrates example touch points 40 on an example touch sensor 10. Touch sensor 10 includes panel 32 and clusters 30a and 30b. Clusters 30a and 30b include tracks 14a and 14b and tracks 14c and 14d, respectively. Panel 32, clusters 30, and tracks 14 may have any suitable structure, configuration, and/or function described above with respect to FIGS. 1, 2, and 3A-3C.

Touch points 40a-40c represent a position of object 34 (not shown) moving from left to right across touch sensor 10. Touch points 40 may be positions where a portion of object 34 physically touches touch sensor 10, or they may be orthogonal projections of a portion of object 34 onto touch sensor 10. In the illustrated embodiments, touch points 40a-40c each fall directly above a portion of cluster 30a. Because tracks 14a and 14b of cluster 30a may be galvanically connected and sensed together during the sensing sequence, the similar capacitance values measured at touch points 40a-40c (see FIG. 4B) may reduce the linearity of the measured position of object 34 as it moves across touch sensor 10. This issue is described further with respect to FIGS. 4B, 5A, and 5B. This potential for reduced precision may be mitigated by cluster configurations discussed below with respect to FIGS. 7A-7C.

Figure 4B:
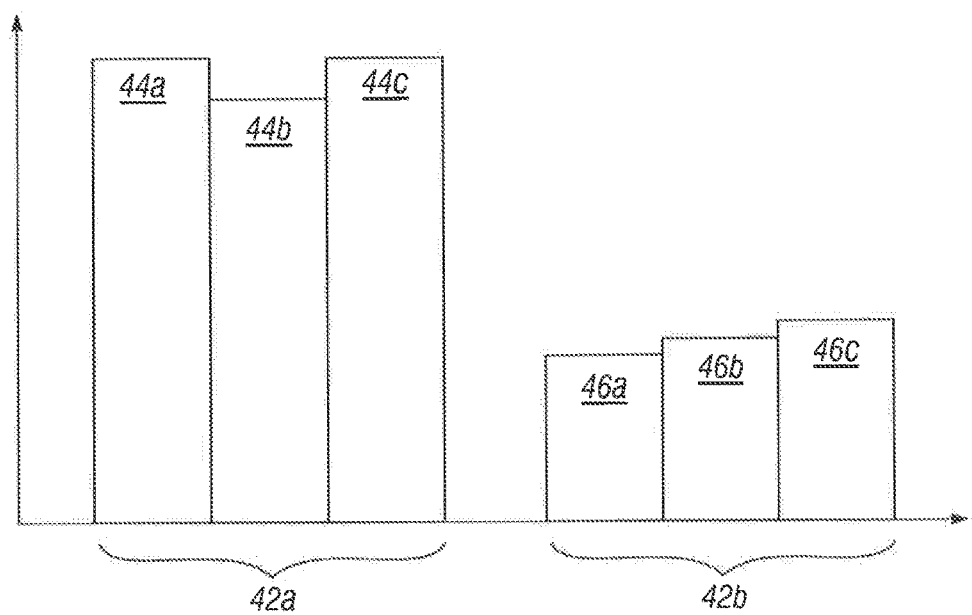
FIG. 4B illustrates a graph of example measurements that may be taken by certain embodiments of a touch sensor.

FIG. 4B illustrates a graph of example measurements 44 and 46 that may be taken by certain embodiments of touch sensor 10. Measurements 42a, which include measurements 44a-44c, correspond to measurements associated with cluster 30a of FIG. 4A. Measurements 42b, which include measurements 46a-46c, correspond to measurements associated with cluster 30b of FIG. 4A.

Measurements 42a represent values measured by cluster 30a of FIG. 4A, and measurements 42b represent values measured by cluster 30b of FIG. 4A. Measurements 44a-44c correspond to the values measured by cluster 30a at touch points 40a-40c, respectively, and measurements 46a-46c correspond to the values measured by cluster 30b at touch points 40a-40c, respectively. As discussed above, controller 12 may evaluate multiple measurements to determine the position of object 34. For example, the measured position of object 34 may be based on capacitive values measured by multiple clusters 30. Thus, as a particular example, the position of object 34 when object 34 is located at touch point 40a may be determined using measurements 44a and 46a (as well as values measured by other clusters 30). Furthermore, the position of object 34 may also be determined by taking into account previously measured values. Thus, as a particular example, the position of object 34 when object 34 is located at touch point 40c may be determined using measurements 44c and 46c as well as values measured during previous sensing sequences, such as 44b and 46b. Because tracks 14a and 14b of cluster 30a may be galvanically connected and sensed together during the sensing sequence, values measured when object 34 is located at touch points 40a-40c may not be sufficiently distinct to precisely distinguish between these touch points 40. Such measurement difficulties may be particular pronounced when clusters 30 include larger numbers of tracks 14.

Figure 5A:
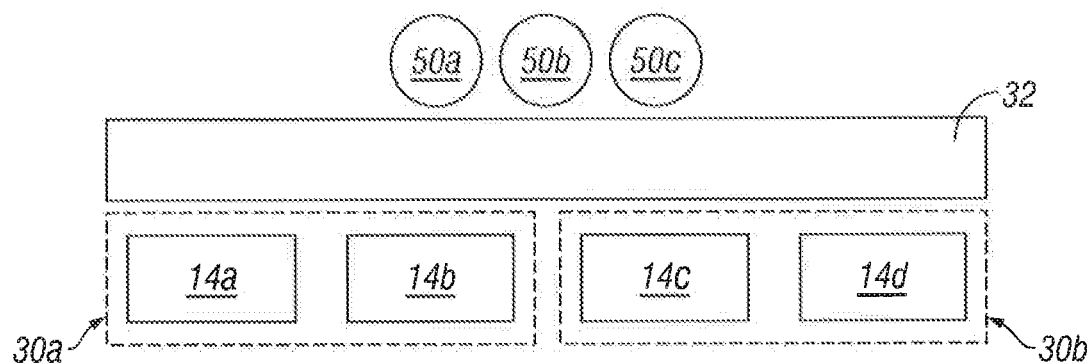
FIG. 5A illustrates example touch points on an example touch sensor.

FIG. 5A illustrates example touch points 50 on an example touch sensor 10. Touch sensor 10 includes panel 32 and clusters 30a and 30b. Clusters 30a and 30b include tracks 14a and 14b and tracks 14c and 14d, respectively. Panel 32, clusters 30, and tracks 14 may have any suitable structure, configuration, and/or function described above with respect to FIGS. 1, 2, and 3A-3C.

Touch points 50a-50c represent a position of object 34 (not shown) moving from left to right across touch sensor 10. Touch points 50 may be positions where a portion of object 34 physically touches touch sensor 10, or they may be orthogonal projections of a portion of object 34 onto touch sensor 10. In the illustrated embodiments, touch points 50a-50c move from left to right, moving from cluster 30a to cluster 30b. Because clusters 30a and 30b are not galvanically connected during their respective sensing sequences, capacitive values measured when object 34 is at touch points 50a-50c may provide improved touch resolution. For example, such embodiments may provide increased linearity when determining the position of object 34 as it moves across touch sensor 10 in a straight line. Certain embodiments may take advantage of improved touch-sensing precision at the borders of clusters 30 by utilizing cluster configurations discussed below with respect to FIGS. 6-9.

Figure 5B:
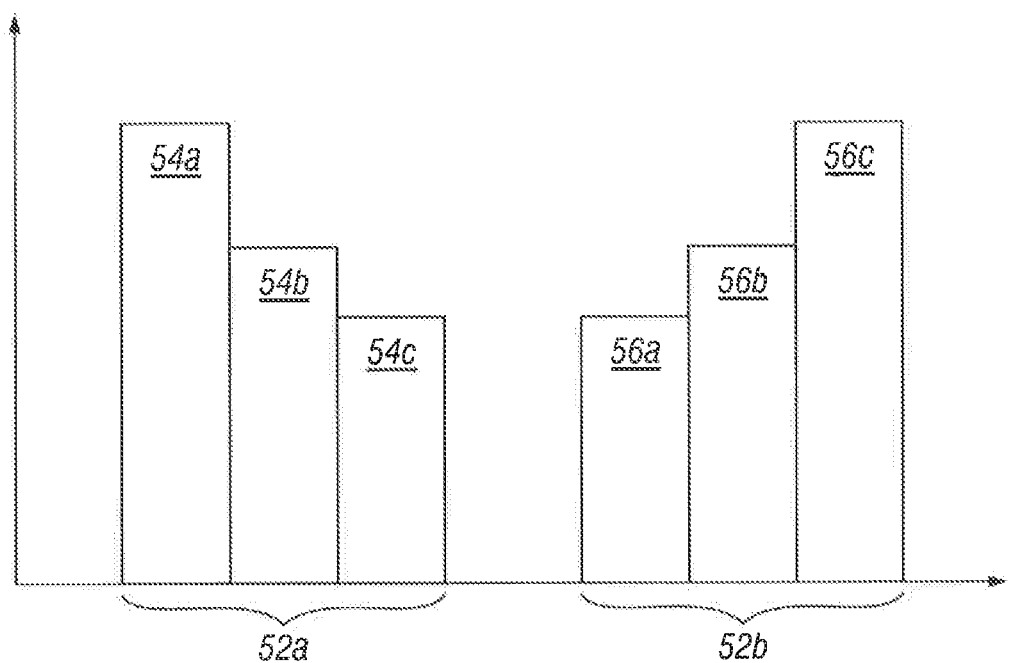
FIG. 5B illustrates a graph of example measurements that may be taken by certain embodiments of a touch sensor.

FIG. 5B illustrates a graph of example measurements 44 that may be taken by certain embodiments of touch sensor 10. Measurements 52a, which include measurements 54a-54c, correspond to measurements associated with cluster 30a of FIG. 5A. Measurements 52b, which include measurements 56a-56c, correspond to measurements associated with cluster 30b of FIG. 5A.

Measurements 52a represent values measured by cluster 30a of FIG. 5A, and measurements 52b represent values measured by cluster 30b of FIG. 5A. Measurements 54a-54c correspond to the values measured by cluster 30a at touch points 50a-50c, respectively, and measurements 56a-56c correspond to the values measured by cluster 30b at touch points 50a-50c, respectively. As discussed above, controller 12 may evaluate multiple measurements to determine the position of object 34. For example, the measured position of object 34 may be based on capacitive values measured by multiple clusters 30. Thus, as a particular example, the position of object 34 when object 34 is located at touch point 50a may be determined using measurements 54a and 56a (as well as values measured by other clusters 30). Furthermore, the position of object 34 may also be determined by taking into account previously measured values. Thus, as a particular example, the position of object 34 when object 34 is located at touch point 50c may be determined using measurements 54c and 56c as well as values measured during previous sensing sequences, such as 54b and 56b. Because clusters 30a and 30b may be sensed separately, values measured when object 34 is located at touch points 50a-50c may be sufficiently distinct to precisely distinguish between these touch points 50. Certain embodiments may take advantage of this improved touch-sensing precision at the borders of clusters 30 by utilizing cluster configurations discussed below with respect to FIGS. 6-9.

Figure 6A:
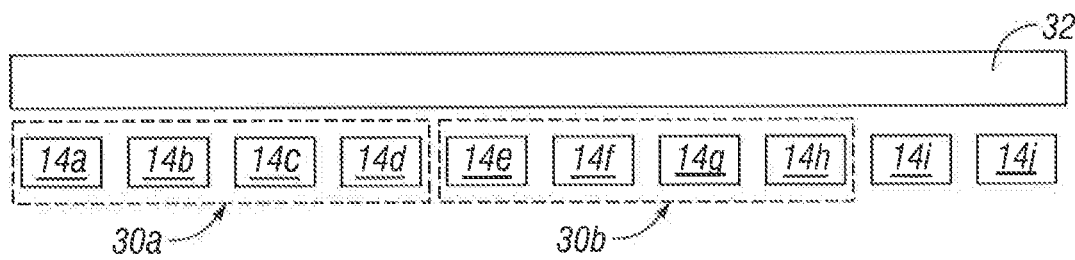
FIG. 6A illustrates an example cluster configuration that may be used in certain embodiments of a touch sensor.
Figure 6B:
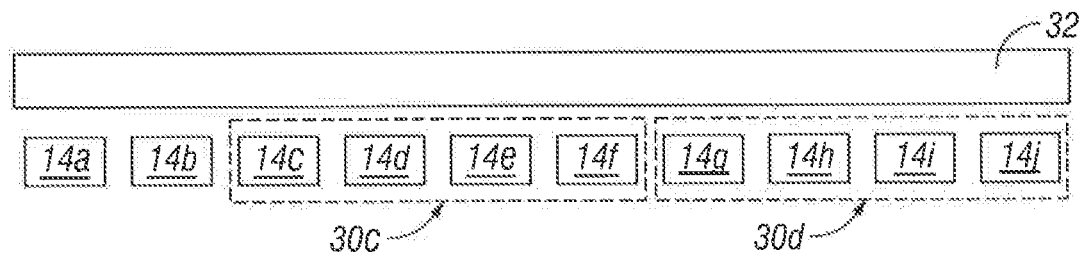
FIG. 6B illustrates an example cluster configuration that may be used in certain embodiments of a touch sensor.

FIGS. 6A and 6B illustrate example cluster configurations that may be used in certain embodiments of touch sensor 10. In the illustrated embodiments, touch sensor 10 includes panel 32 and tracks 14a-j. In FIG. 6A, tracks 14 are configured to form clusters 30a and 30b, which include tracks 14a-d and tracks 14e-h, respectively. In FIG. 6B, tracks 14 are configured to form clusters 30c and 30d, which include tracks 14c-f and tracks 14g-i, respectively. For purposes of simplified illustration, FIGS. 6A and 6B depict only two clusters 30. However, touch sensor 10 may be configured to include additional clusters 30 using tracks 14 that are not used in the illustrated clusters 30. For example, in FIG. 6A, tracks 14i and 14j may operate as part of additional clusters 30 (not shown) or may operate independently (e.g., tracks 14i and 14j may be sensed individually without being clustered with other tracks 14). Panel 32, clusters 30, and tracks 14 may have any suitable structure, configuration, and/or function described above with respect to FIGS. 1, 2, and 3A-3C.

FIGS. 6A and 6B illustrate two cluster configurations that may be used in succession during a "rolling cluster" sequence. As used herein, a rolling cluster sequence refers to a sequential shifting of the configuration of clusters 30. As explained above with respect to FIGS. 4A-4B and 5A-5B, the position of object 34 may be more precisely determined when located at or near the intersection of clusters 30. Utilizing rolling clusters may increase the likelihood that object 34 is positioned at or near the intersection of two or more clusters 30, which may improve the precision, resolution, and/or linearity of touch-sensor 10. Such improvements may be particular useful when utilizing cluster configurations with larger numbers of tracks 14 per cluster 30.

Figure 7A:
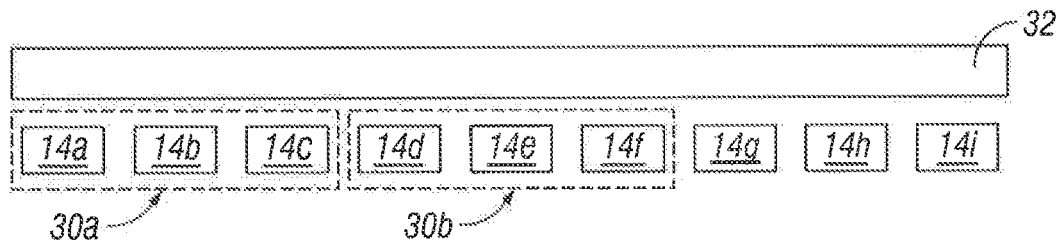
FIG. 7A illustrates an example cluster configuration that may be used in certain embodiments of a touch sensor.
Figure 7B:
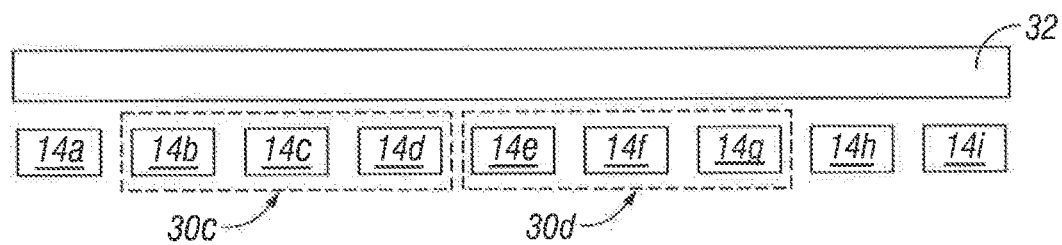
FIG. 7B illustrates an example cluster configuration that may be used in certain embodiments of a touch sensor.
Figure 7C:
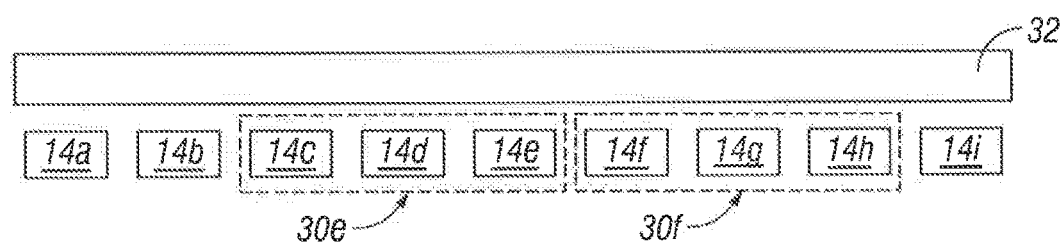
FIG. 7C illustrates an example cluster configuration that may be used in certain embodiments of a touch sensor.

Determination of the position of object 34 may be based on measurements from a single cluster pattern (e.g., the clusters 30 shown in FIG. 6B), or the position may be based on a multiple cluster patterns (e.g., the clusters 30 shown in both FIGS. 6A and 6B). A rolling cluster sequence may involve two or more sequential cluster patterns. For example, FIGS. 6A-6B illustrate a rolling cluster sequence that may use two cluster patterns, and FIGS. 7A-7C illustrate a rolling cluster sequence that may use three cluster patterns. Other embodiments may use any suitable configuration of clusters 30 in any suitable rolling cluster sequence. For example, some embodiments may use larger cluster sizes and/or different cluster shapes. As another example, some embodiments may use different numbers of cluster patterns in a single rolling cluster sequence (e.g., four, five, six, or more different cluster patterns used sequentially), and some embodiments may cycle through cluster patterns in different orders. As used herein, a "cluster pattern" refers to a particular configuration of clusters 30 at a particular point in time or during a particular span of time.

In certain embodiments, controller 12 may sequentially alter the configuration of clusters 30. For example, tracks 14a-14d may be galvanically connected and sensed as cluster 30a, and tracks 14e-14h may be galvanically connected and sensed as cluster 30b, as shown in FIG. 6A. After measuring capacitance values associated with this configuration, tracks 14c-14f may be galvanically connected and sensed as cluster 30c, and tracks 14g-14j may be galvanically connected and sensed as cluster 30 d, as shown in FIG. 6B. Controller 12 may determine the position of object 34 using the various capacitance values associated with these rolling clusters. For example, controller 12 may compare values measured by different clusters 30. As another example, controller 12 may calculate one or representative values that may indicate the position of object 34 relative to touch sensor 10. As a particular example, controller 12 may calculate a representative value for each track 14 based on the capacitance values measured from clusters 30. For example, a representative value for a particular track 14 may be calculated based on the capacitance value measured from each cluster 30 to which it belonged, and the relative representative values of tracks 14 (e.g. the shape of a plot of the representative values) may indicate the position of object 34. One or more additional calculations may also be used, such as, for example, weighted averages, linear approximation, and balanced position techniques. Rolling clusters may improve the precision, resolution, and/or linearity of touch sensors 10 utilizing clusters 30 that include multiple tracks 14. Such embodiments may enable touch sensor 10 to provide improved sensitivity resulting from clustering tracks 14, as described above, while also avoiding potential reductions in precision, resolution, and/or linearity (as described with respect to FIGS. 4A and 4B) that might otherwise be created by such clustering.

FIGS. 7A-7C illustrate example cluster configurations that may be used in certain embodiments of touch sensor 10. Touch sensor 10 includes panel 32 and clusters 30a and 30b. In FIG. 7A, clusters 30a and 30b include tracks 14a-14c and tracks 14d-14f, respectively. In FIG. 7B, clusters 30c and 30d include tracks 14b-14d and tracks 14e-14g, respectively. In FIG. 7C, clusters 30e and 30f include tracks 14c-14e and tracks 14f-14h, respectively. For purposes of simplified illustration, FIGS. 7A-7C depict only clusters 30a and 30b. However, touch sensor 10 may include additional clusters 30 using tracks 14 that are not used in the illustrated clusters 30.

For example, in FIG. 7A, tracks 14g-l may operate as part of an additional cluster 30 (not shown) or may operate independently (e.g., tracks 14g-I may be sensed individually without being clustered with other tracks 14). Panel 32, clusters 30, and tracks 14 may have any suitable structure, configuration, and/or function described above with respect to FIGS. 1, 2, 3A-3C, 6A-6B, and 7A-7C.

FIGS. 7A-7C illustrate three cluster configurations that may be used in succession during a rolling cluster sequence. These configurations may be used in embodiments utilizing rolling clusters that shift clusters 30 successively by a single track 14. As explained above with respect to FIGS. 4A-4B, 5A-5B, and 6A-6B, the position of object 34 may be more precisely determined when located at or near the intersection of clusters 30. Utilizing rolling clusters may increase the likelihood that object 34 is positioned at or near the intersection of two or more clusters 30, which may improve the precision, resolution, and/or linearity of touch-sensor 10. Such improvements may be particular useful when utilizing cluster configurations with larger numbers of tracks 14 per cluster 30. Furthermore, utilizing rolling clusters that shift by a single track 14 may further improve the precision, resolution, and/or linearity of touch sensing measurements.

In certain embodiments, controller 12 may sequentially alter the configuration of clusters 30. For example, tracks 14a-14c may be galvanically connected and sensed as cluster 30a, and tracks 14d-14f may be galvanically connected and sensed as cluster 30b, as shown in FIG. 7A. After measuring capacitance values associated with this configuration, tracks 14b-14d may be galvanically connected and sensed as cluster 30c, and tracks 14e-14g may be galvanically connected and sensed as cluster 30d, as shown in FIG. 7B. After measuring capacitance values associated with this configuration, tracks 14c-14e may be galvanically connected and sensed as cluster 30e, and tracks 14f-14h may be galvanically connected and sensed as cluster 30f, as shown in FIG. 7C. Controller 12 may determine the position of object 34 using the various capacitance values associated with these rolling clusters. For example, controller 12 may compare values measured by different clusters 30. As another example, controller 12 may calculate one or representative values that may indicate the position of object 34 relative to touch sensor 10. As a particular example, controller 12 may calculate a representative value for each track 14 based on the capacitance values measured from clusters 30. For example, a representative value for a particular track 14 may be calculated based on the capacitance value measured from each cluster 30 to which it belonged, and the relative representative values of tracks 14 (e.g. the shape of a plot of the representative values) may indicate the position of object 34. One or more additional calculations may also be used, such as, for example, weighted averages, linear approximation, and balanced position techniques. Rolling clusters may improve the precision, resolution, and/or linearity of touch sensors 10 utilizing clusters 30 that include multiple tracks 14. Such embodiments may enable touch sensor 10 to provide improved sensitivity resulting from clustering tracks 14, as described above, while also avoiding potential reductions in precision, resolution, and/or linearity (as described with respect to FIGS. 4A and 4B) that might otherwise be created by such clustering.

Figure 8A:
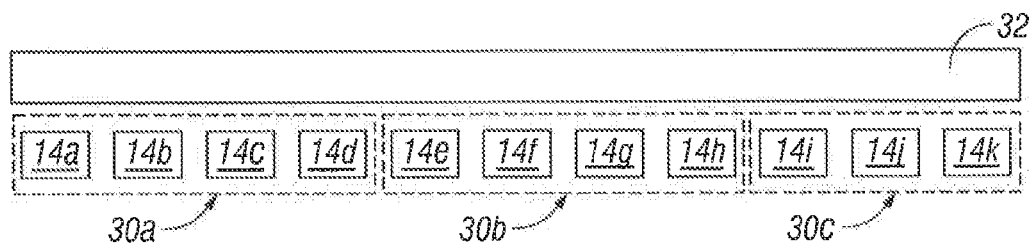
FIG. 8A illustrates an example cluster configuration that may be used in certain embodiments of a touch sensor.
Figure 8B:
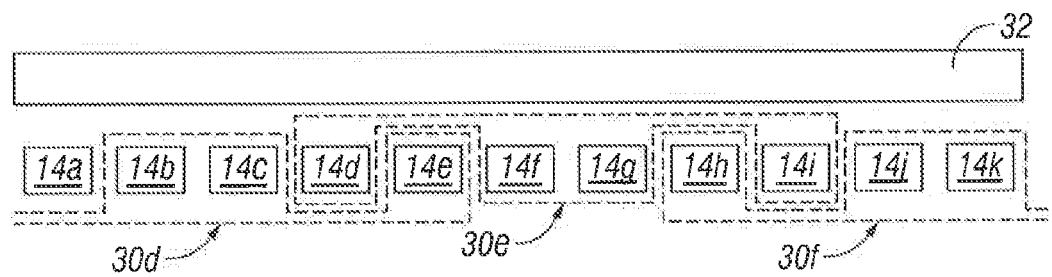
FIG. 8B illustrates an example cluster configuration that may be used in certain embodiments of a touch sensor.

FIGS. 8A and 8B an example cluster configurations that may be used in certain embodiments of touch sensor 10. Touch sensor 10 includes panel 32 and clusters 30a-c. In FIG. 8A, cluster 30a includes tracks 14a-14d, cluster 30b and tracks 14e-14h, and cluster 30c includes tracks 14i-14k.

Cluster 30c may also include additional tracks 14 (not shown). For purposes of simplified illustration, FIG. 8A depicts only clusters 30a-30c. However, touch sensor 10 may include additional clusters 30 using tracks 14 that are not used in the illustrated clusters 30. Panel 32, clusters 30, and tracks 14 may have any suitable structure, configuration, and/or function described above with respect to FIGS. 1, 2, and 3A-3C.

FIG. 8B illustrates an example interleaved cluster configuration that may be used in certain embodiments. In FIG. 8B, cluster 30d includes tracks 14b, 14c, and 14e; cluster 30e includes tracks 14d, 14f-14g, and 14i; and cluster 30f includes tracks 14h, and 14j-14k. Clusters 30d and 30f may include additional tracks 14 (not shown). For purposes of simplified illustration, FIG. 8B depicts only clusters 30d-30f. However, touch sensor 10 may include additional clusters 30 using tracks 14 that are not used in the illustrated clusters 30. Panel 32, clusters 30, and tracks 14 may have any suitable structure, configuration, and/or function described above with respect to FIGS. 1, 2, 3A-3C, 6A-6B, and 7A-7C.

As used herein, "interleaved clusters" refers to clusters 30 having one or more tracks 14 interspersed within the outer boundary of another cluster 30 from a perspective orthogonal to the surface of touch sensor 10. Interleaved clusters may have any suitable number and/or arrangement of tracks 14 that are interleaved with the tracks 14 of another cluster 30. FIG. 8B illustrates a particular pattern of interleaved clusters 30, and other embodiments may use any suitable interleaving patterns. Interleaving the edges of clusters 30 as shown in FIG. 8B may provide improved linearity when measuring an object moving across the surface of touch sensor 10 while touching or hovering near device 2. Such embodiments may mitigate potential reductions in precision, resolution, and/or linearity (as described with respect to FIGS. 4A and 4B) that might otherwise be created by clustering of tracks 14.

In some embodiments, interleaved cluster configurations, such as the configuration illustrated in FIG. 8B, may be triggered by one or more previous measurements. For example, one or more measurements from clusters 30 of FIG. 8A may trigger the interleaved cluster configuration of FIG. 8B. Such embodiments may allow touch sensor 10 to achieve improved precision, resolution, and/or linearity when certain conditions are detected. For example, interleaved configurations may be triggered when controller 12 detects sufficiently nonlinear readings of the position of object 34, which may indicate that measurements of the position of object 34 have sub-optimal linearity in detecting the movement of object 34. Furthermore, in some embodiments, interleaved cluster configurations may be used in conjunction with rolling clusters. For example, a rolling cluster may be used with the configuration shown in FIG. 8l3 such that clusters 30d-f effectively "shift" along touch sensor 10, analogous to the "shifting" of clusters 30 illustrated in FIGS. 6A-B and 7A-7C. In other embodiments, interleaved cluster configurations may be used in conjunction with the alteration of cluster sizes illustrated shown in FIGS. 3A-C. For example, when object 34 is detected at shorter distances from touch sensor 10 (e.g., distance 36b of FIG. 3B), smaller cluster sizes and non-interleaved clusters may be used, and when object 34 is detected at longer distances from touch sensor 10 (e.g., distance 36a of FIG. 3B) larger cluster sizes and interleaved clusters may be used. Such embodiments may allow touch sensor 10 to target the use of linearity-improving configurations more precisely to situations in which the linearity of its sensing may be reduced.

Figure 9A:
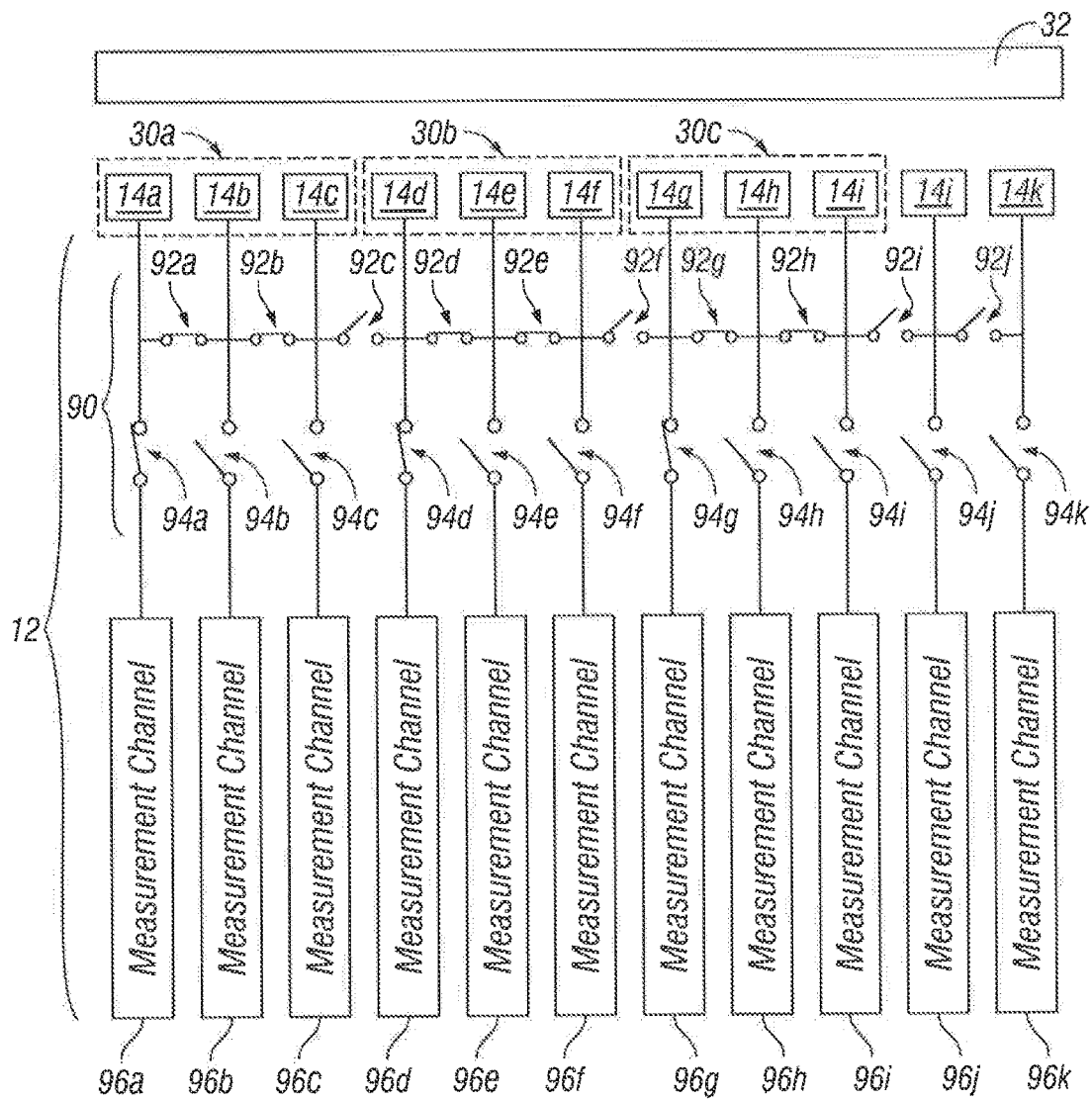
FIG. 9A illustrates an example switch network that may be used to configure clusters in certain embodiments of a touch sensor.
Figure 9B:
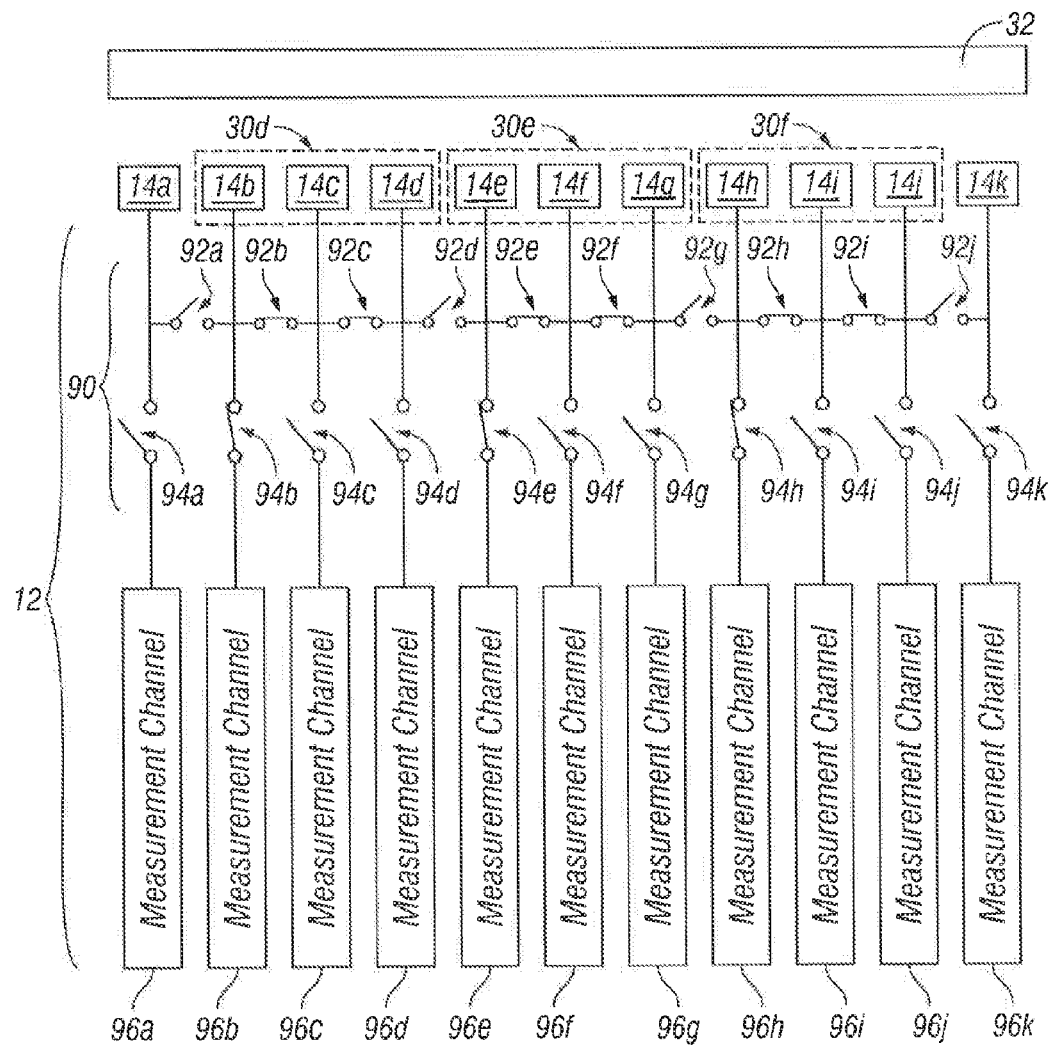
FIG. 9B illustrates an example switch network that may be used to configure clusters in certain embodiments of a touch sensor.

FIGS. 9A and 9B illustrate an example switch network 90 that may be used to configure clusters 30 in certain embodiments of touch sensor 10 and controller 12. In the illustrated embodiment, touch sensor 10 includes panel 32 and tracks 14a-14k, which form clusters 30a-30c; and controller 12 includes switch network 90 and measurement channels 96. Panel 32, clusters 30, and tracks 14 may have any suitable structure, configuration, and/or function described above with respect to FIGS. 1, 2, 3A-3C, 6A-6B, 7A-7C, and 8A-8B.

Switch network 90 may include any number, arrangement, and/or configuration of switches that are operable to connect one or more tracks 14 to one or more measurement channels 96. Switch network 90 may be configured by controller 12 during the operation of touch sensor 10. For example, controller 12 may control switch network 90 to form the cluster patterns shown in FIGS. 3A-C, 6A-6B, 7A-7C, and 8A-8B. Certain embodiments may use any suitable switch network 90, and the configuration shown in FIGS. 9A-B is used merely as an example. For example, cluster patterns shown in FIGS. 6A-6B and 7A-7C may be configured using switch network 90 shown in FIGS. 9A-B, while the cluster pattern shown in FIG. 8B may rely on a more complex switch network 90 to facilitate the configuration of interleaved clusters 30. In the illustrated embodiments, switch network 90 includes switches 92 and 94.

Switches 92 and 94 may be any suitable circuitry operable to connect or disconnect one or more tracks 14 from a portion of controller 12. For example, switches 92 and 94 may be any appropriate form of mechanical and/or electrical switching device operable to conduct current in the on position and/or form an open circuit in the off position. As a particular example, switches 92 and 94 may be any appropriate form of transistor device, including field effect transistors (FETS). In some embodiments, switches 92 and 94 may be implemented using metal-oxide-semiconductor FETS (MOSFETS), such as NMOS or PMOS transistors. The gates of switches 92 and 94 may be controlled via one or more control signals transmitted from controller 12. Switches 92 and 94 may be part of touch sensor 10 and/or controller 12, and touch sensor 10 and/or controller 12 may have any suitable number, type, and/or configuration of switches 92 and 94.

Measurement channels 96 represent portions of controller 12 operable to receive and/or transmit signals to one or more tracks 14 to facilitate the taking of one or more capacitive measurements. Measurement channels 96 may include any components and may perform any measurement functionality described above with respect to controller 12 in FIG. 1. In some embodiments, different measurement channels 96 may be physically distinct. In other embodiments, measurement channels 96 may be logically distinct while sharing one or more common physical components. For example, each measurement channel 96 may include distinct measurement circuitry, or one or more portions of measurement channels 96 may operate as a multiplexer, connecting one of multiple inputs to common measurement circuitry.

Switches 92 may operate to galvanically connect the tracks 14 of a particular cluster 30, while switches 94 may operate to connect a particular cluster 30 to a particular measurement channel 96. For example, as shown in FIG. 9A, switches 92a-92b are closed, and switch 92c is open, thereby galvanically connecting tracks 14a-c to form cluster 30. Furthermore, switch 94a is closed, and switches 94b-94c are open, thereby connecting cluster 30a to measurement channel 96a. Similarly, switches 92d-92e and switch 94d are closed to form cluster 30b and connect it to measurement channel 96d, and switches 92g-92h and switch 94g are closed to form cluster 30f and connect it to measurement channel 96g. Analogous configurations may be used to form additional clusters 30 and to connect them to their respective measurement channels 96. Furthermore, switches 94j-94k are open, thereby disconnecting tracks 14j-14k from any measurement channel 96. Such embodiments may be used to prevent tracks 14 that are not included in a cluster 30 from being measured, though this is not required. For example, other embodiments may connect tracks 14 that are not included in a cluster 30 to a measurement channel 96.

As shown in FIG. 9B, altering the state of switch network 90 may form different clusters 30 and/or connect clusters 30 to different measurement channels. FIG. 9B illustrates a configuration of switch network 90 that may be used to form clusters 30d-30f. Such configurations may facilitate the "shifting" of clusters described above with respect to FIGS. 6A-6B and FIGS. 7A-7C, which may be used during rolling cluster sensing sequences. In the illustrated embodiment, switches 92a and 92d are opened and switches 92b-92c are closed to form cluster 30d. Furthermore, switch 94b is closed to connect cluster 30d to measurement channel 96b. Similarly, switches 92e-92f and switch 94e are closed to form cluster 30e and connect it to measurement channel 96e, and switches 92h-92i and switch 94h are closed to form cluster 30f and connect it to measurement channel 96h. Switch network 90 may therefore facilitate alterations of the configurations of clusters 30 to improve the sensitivity of touch sensor 10 and/or provide improved precision, resolution, and/or linearity when touch sensor 10 is detecting the movement of object 34.

Figure 10:
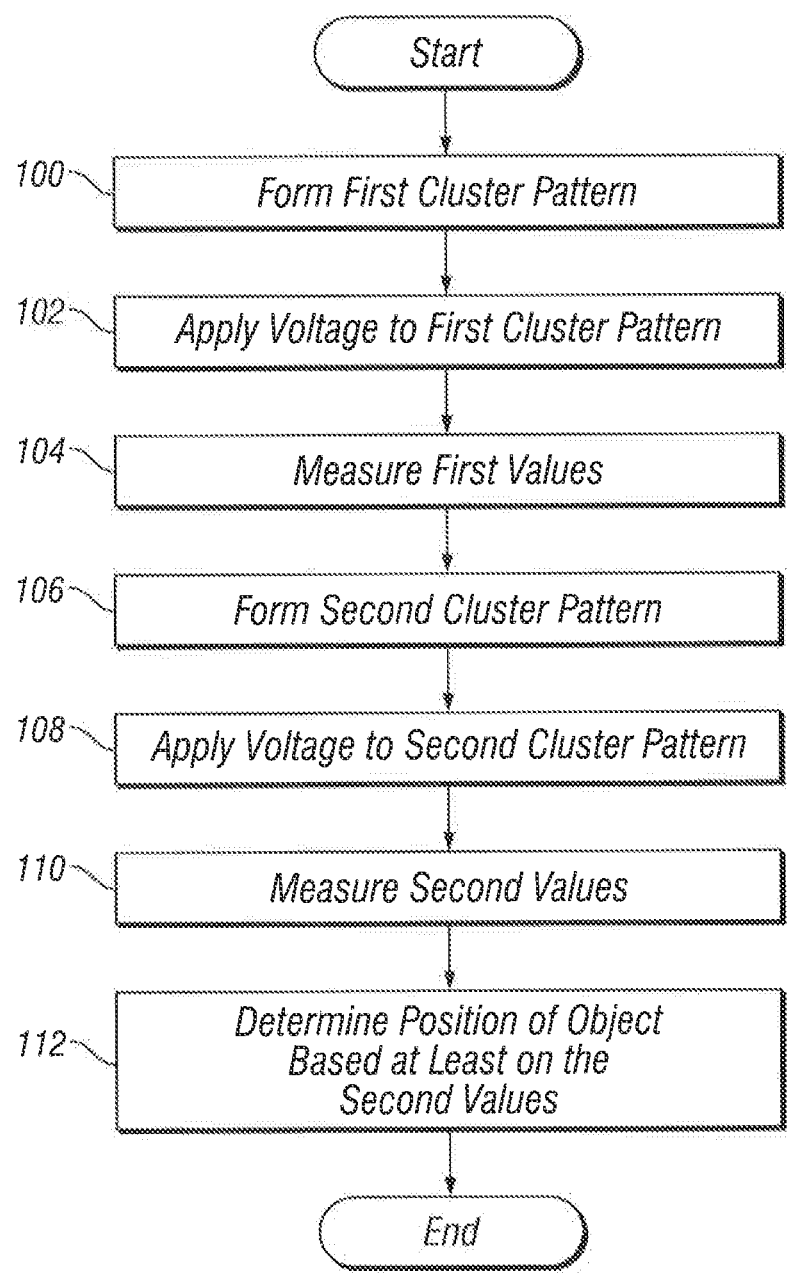
FIG. 10 illustrates an example method for use with certain embodiments of a touch sensor.

FIG. 10 illustrates an example method for use with certain embodiments of touch sensor 10. Various embodiments may perform some, all, or none of the steps described below. Furthermore, certain embodiments may perform these steps in different orders or in parallel, and certain embodiments may also perform additional steps. Moreover, any suitable component of touch sensor 10 and/or controller 12 may perform one or more steps of the sensing sequence.

At step 100, controller 12 connects tracks 14 to form a first cluster pattern. Tracks 14 may be connected galvanically, capacitively, or using any suitable method. The first cluster pattern may have clusters 30 of any suitable size, shape, and/or configuration. For example, the first cluster pattern may have the configurations shown in FIGS. 6-9 or any suitable configuration. Furthermore, the first cluster pattern may include different types of clusters 30 and may include tracks 14 that are not part of a cluster 30. In some embodiments, the first cluster pattern may include interleaved clusters 30 with any suitable interleaving pattern.

At step 102, voltage is applied to the clusters 30 of the first cluster pattern. Voltage may be applied to a cluster 30 by connecting it to a voltage source (e.g. a voltage supply rail), a current source, or any other suitable component. Voltage may be applied for a fixed amount of time or a variable amount of time. In some embodiments, a predetermined amount of charge may be applied to each cluster 30. The application of voltage to cluster 30 may be performed at least in part by controller 12. Voltage may also be applied to additional clusters 30, and multiple clusters 30 may be charged simultaneously.

At step 104, controller 12 measures a plurality of first values. Each first value is associated with the capacitance of a respective cluster 30 of the first cluster pattern, and the first values may be measured simultaneously or sequentially. The first values may be measured using any suitable method described above with respect to FIG. 1. Each first value may be a capacitance or it may be a measurement that is proportional to, related to, or indicative of the capacitance (or change in capacitance) experienced by a cluster 30. For example, the first value may be a voltage measurement, current measurement, timing measurement, any other suitable measurement, or any combination thereof that is measured under conditions that make the measured value indicative of the capacitance (or change in capacitance) experienced by cluster 30. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of a position of object 34 relative to touch sensor 10. In certain embodiments, the determination of the first value may be performed at least in part by controller 12. The first values may be used to determine the cluster configuration, trigger one or more functions, estimate a position of object 34 relative to touch sensor 10, estimate a shape and/or size of object 34 (e.g., by analyzing the distribution of first values measured by multiple clusters 30), and/or perform any suitable function.

At step 106, controller 12 connects tracks 14 to form a second cluster pattern. In some embodiments, the second cluster pattern may have one or more interleaved clusters 30, though this is not required. Tracks 14 may be connected galvanically, capacitively, or using any suitable method. The second cluster pattern may have clusters 30 of any suitable size, shape, and/or configuration. For example, the second cluster pattern may have the configuration shown in FIG. 8B or any suitable configuration, or the second cluster pattern may have different sizes of clusters 30 and/or different interleaving patterns. Furthermore, the second cluster pattern may include different types of clusters 30 and may include tracks 14 that are not part of a cluster 30. For example, some clusters 30 may be interleaved while other clusters 30 are not, or different clusters 30 in the second cluster pattern may have different interleaving patterns from one another. Interleaved clusters 30 may provide improved precision, resolution, and/or linearity for touch sensing measurements, including hover measurements.

The formation of the second cluster pattern may occur in response to the first values. For example, one or more of the first values may trigger controller 12 to form interleaved clusters 30. Such embodiments may allow touch sensor 10 to achieve improved precision, resolution, and/or linearity when certain conditions are detected. For example, interleaved configurations may be triggered when controller 12 detects sufficiently nonlinear readings of the position of object 34, which may indicate that measurements of the position of object 34 have sub-optimal linearity in detecting the movement of object 34. In some embodiments, interleaved cluster configurations may be used in conjunction with the alteration of cluster sizes illustrated shown in FIGS. 3A-C. For example, when object 34 is detected at shorter distances from touch sensor 10 (e.g., distance 36b of FIG. 3B), smaller cluster sizes and non-interleaved clusters 30 may be used, and when object 34 is detected at longer distances from touch sensor 10 (e.g., distance 36a of FIG. 3B) larger cluster sizes and interleaved clusters 30 may be used. Such embodiments may allow controller 12 to target the use of linearity-improving configurations more precisely to situations in which the linearity of its sensing may be reduced.

In some embodiments, the second cluster pattern may include clusters 30 that are "shifted" configurations of the clusters 30 of the first cluster pattern. For example, the first and second cluster patterns may be cluster patterns used in a rolling cluster embodiment, as described above with respect to FIGS. 6A-6B and 7A-7C. In such embodiments, each cluster 30 of the second cluster pattern may include one or more tracks 14 that were included in a primary cluster 30 of the first cluster pattern and one or more tracks 14 that were included in a secondary cluster 30 of the first cluster pattern. As used herein, "primary" and "secondary" does not indicate a greater or lesser level of importance. In some embodiments, each cluster 30 of the second cluster pattern may include more tracks 14 from the primary cluster 30 than from the secondary cluster 30. For example, for clusters 30 of size N, each cluster 30 of the second cluster pattern may include N−1 tracks 14 from the primary cluster and a single track 14 from the secondary cluster 30. Thus, the secondary cluster pattern may shift the first cluster pattern by one track 14. Other embodiments may utilize different amounts of shifting. For example, as shown in FIGS. 6A-6B, clusters 30 may be shifted approximately to the halfway point of clusters 30. Such embodiments may provide a balance between (1) the benefits in precision, resolution, and/or linearity provided by using rolling clusters and (2) the costs of providing additional measurements, such as time, processing resources, or other costs.

At step 108, voltage is applied to the clusters 30 of the second cluster pattern. The application of voltage to the second cluster pattern may utilize analogous processes to those described above for step 102.

At step 110, controller 12 measures a plurality of second values. Each second value is associated with the capacitance of a respective cluster 30 of the second cluster pattern, and the second values may be measured simultaneously or sequentially. The second values may be measured using any suitable method described above with respect to FIG. 1. Each second value may be a capacitance or it may be a measurement that is proportional to, related to, or indicative of the capacitance (or change in capacitance) experienced by a cluster 30. For example, the second value may be a voltage measurement, current measurement, timing measurement, any other suitable measurement, or any combination thereof that is measured under conditions that make the measured value indicative of the capacitance (or change in capacitance) experienced by cluster 30. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of a position of object 34 relative to touch sensor 10. In certain embodiments, the determination of the second value may be performed at least in part by controller 12. The second values may be used to determine the cluster configuration, trigger one or more functions, estimate a distance between object 34 and touch sensor 10, estimate a shape and/or size of object 34 (e.g., by analyzing the distribution of second values measured by multiple clusters 30), and/or perform any suitable function.

At step 112, controller 12 determines a position of object 34 relative to touch sensor 10 based at least on the second values. For example, controller 12 may calculate a representative value for each track 14 based at least on the second values associated with clusters 30 that include that track 14.

The representative values may approximate the capacitance or change in capacitance that would be experienced by each 14 in a non-clustered configuration. The representative values may therefore indicate the relative proximity of object 34 to each track 14. In some embodiments, the determination of the position of object 34 may also be based on one or more previously measured values, such as the first values. Furthermore, some embodiments may utilize one or more additional calculations, such as, for example, weighted averages, linear approximation, or any suitable technique. The measured position may be an estimation of where a portion of object 34 physically touches touch sensor 10. The measured position may also be an estimation of an orthogonal projection of a portion of object 34 onto touch sensor 10 (e.g., a hover position). In some embodiments, the determination of the distance between object 34 and touch sensor 10 may be performed at least in part by controller 12. Determining the position of object 34 as described herein may enable touch sensor 10 to provide improved sensitivity resulting from clustering tracks 14, as described above, while also mitigating potential reductions in precision, resolution, and/or linearity (as described with respect to FIGS. 4A and 4B) that might otherwise be created by utilizing larger cluster sizes. Such embodiments may also improve the precision, resolution, and/or linearity of hover measurements.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while the embodiment of FIG. 2 illustrates a particular configuration of tracks 14, any suitable configuration may be used. As another example, while FIGS. 3A-3C, 4A, 5A, 6A-6B, 7A-7C, 8A-8B, and 9A-9B illustrate particular configurations of clusters 30, any suitable number, type, and configuration may be used. Furthermore, some embodiments may combine two or more of the techniques described herein, such as, for example, dynamically changing cluster sizes (as shown, for example, in FIGS. 3A-3C), rolling clusters (as shown for example, in FIGS. 6A-613 and 7A-7C), and interleaved clusters (as shown for example, in FIG. 813). As another example, while FIGS. 3A-3C, 4A, 5A, 6A-6B, 7A-7C, 8A-8B, and 9A-9B depict a single layer of tracks 14, other embodiments may include multiple layers of tracks 14. As yet another example, while this disclosure describes certain touch-sensing operations that may be performed using the components of touch sensor 10 and controller 12, any suitable touch-sensing operations may be performed. Furthermore, certain embodiments may alternate between or combine one or more touch-sensing methods described herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   one or more processors; and
   one or more memory units coupled to the one or more processors, the one or more memory units collectively storing logic configured to, when executed by the one or more processors, cause the one or more processors to perform operations comprising:
   configuring a plurality of electrodes of a sensor to form a first cluster pattern comprising a plurality of first clusters, each first cluster comprising two or more electrodes of the plurality of electrodes, a first cluster being interleaved with one or more adjacent first clusters such that an electrode of the first cluster is positioned between first and second electrodes of at least one of the adjacent first clusters;
   applying voltage to each first cluster;
   sensing each first cluster separately;
   determining a plurality of first values, each first value associated with a capacitance of a respective first cluster;
   configuring, in response to determining the plurality of first values, the plurality of electrodes to form a second cluster pattern comprising a plurality of second clusters, each second cluster comprising two or more electrodes of the plurality of electrodes, the plurality of second clusters being non-interleaved;
   applying voltage to each second cluster;
   sensing each second cluster separately;
   determining a plurality of second values, each second value associated with a capacitance of a respective second cluster; and
   determining a position of an object relative to the sensor based at least on the plurality of second values.

2. The apparatus of claim 1, further comprising a
   plurality of switches, wherein:
   configuring the plurality of electrodes to form the first cluster pattern comprises configuring one or more switches of the plurality of switches to galvanically connect each electrode of each first cluster; and
   configuring the plurality of electrodes to form the second cluster pattern comprises configuring one or more switches of the plurality of switches to galvanically connect each electrode of each second cluster.

3. The apparatus of claim 1, wherein:
   the first cluster interleaved with the one or more adjacent first clusters comprises three or more electrodes of the plurality of electrodes; and
   two electrodes of the three or more electrodes of the at least one first cluster interleaved with the one or more adjacent first clusters are adjacent to one another.

4. The apparatus of claim 1, wherein:
   determining the plurality of first values comprises measuring a first voltage associated with each first cluster after the application of voltage to the first cluster; and determining the plurality of second values comprises measuring a second voltage associated with each second cluster after the application of voltage to the second cluster.

5. The apparatus of claim 1, wherein the determination the plurality of first and second values utilizes self-capacitance measurements.

6. The apparatus of claim 1, wherein each second cluster comprises four or more electrodes.

7. The apparatus of claim 1, wherein each first cluster is at least partially interleaved with one or more adjacent first clusters.

8. The apparatus of claim 1, wherein:
the plurality of electrodes comprises one or more first electrodes, a second electrode adjacent to one or more of the first electrodes, a third electrode adjacent to the second electrode, and one or more fourth electrodes adjacent to the third electrode;
the first cluster comprises the first electrodes and the third electrode; and
one of the one or more adjacent first clusters comprises the second electrode and the fourth electrodes.

9. The apparatus of claim 1, wherein the determination of the position of the object is based further on the plurality of first values.

10. A method comprising:
configuring a plurality of electrodes to form a first cluster pattern comprising a plurality of first clusters, each first cluster comprising two or more electrodes of the plurality of electrodes, a first cluster being interleaved with one or more adjacent first clusters such that an electrode of the first cluster is positioned between first and second electrodes of at least one of the adjacent first clusters;
applying voltage to each first cluster;
sensing each first cluster separately;
determining a plurality of first values, each first value associated with a capacitance of a respective first cluster;
configuring, in response to determining the plurality of first values, the plurality of electrodes to form a second cluster pattern comprising a plurality of second clusters, each second cluster comprising two or more electrodes of the plurality of electrodes, the plurality of second clusters being non-interleaved;
applying voltage to each second cluster;
sensing each second cluster separately;
determining a plurality of second values, each second value associated with a capacitance of a respective second cluster; and
determining a position of an object relative to the touch sensor based at least on the plurality of second values.

11. The method of claim 10, wherein:
configuring the plurality of electrodes to foam the first cluster pattern comprises configuring one or more switches of a plurality of switches to galvanically connect each electrode of each first cluster; and
configuring the plurality of electrodes to form the second cluster pattern comprises configuring one or more switches of the plurality of switches to galvanically connect each electrode of each second cluster.

12. The method of claim 10, wherein:
the at least one first cluster interleaved with the one or more adjacent first clusters comprises three or more electrodes of the plurality of electrodes; and two electrodes of the three or more electrodes of the at least one first cluster interleaved with the one or more adjacent first clusters are adjacent to one another.

13. The method of claim 10, wherein:
determining the plurality of first values comprises measuring a first voltage associated with each first cluster after the application of voltage to the first cluster; and
determining the plurality of second values comprises measuring a second voltage associated with each second cluster after the application of voltage to the second cluster.

14. The method of claim 10, wherein the determination the plurality of first and second values utilizes self-capacitance measurements.

15. The method of claim 10, wherein each first cluster is at least partially interleaved with one or more adjacent first clusters.

16. The method of claim 10, wherein:
the plurality of electrodes comprises one or more first electrodes, a second electrode adjacent to one or more of the first electrodes, a third electrode adjacent to the second electrode, and one or more fourth electrodes adjacent to the third electrodes;
the first cluster comprises the first electrodes and the third electrode; and
one of the one or more adjacent first clusters comprises the second electrode and the fourth electrodes.

17. An apparatus comprising:
one or more processors; and
one or more memory units coupled to the one or more processors, the one or more memory units collectively storing logic configured to, when executed by the one or more processors, cause the one or more processors to perform operations comprising:
configuring a plurality of electrodes of a sensor to form a first cluster pattern comprising a plurality of first clusters, each first cluster comprising two or more electrodes of the plurality of electrodes, a primary first cluster being interleaved with a secondary first cluster such that an electrode of the primary first cluster is positioned between first and second electrodes of the secondary first cluster;
applying voltage to each first cluster;
sensing each first cluster separately;
determining a plurality of first values, each first value associated with a capacitance of a respective first cluster;
configuring, in response to determining the plurality of first values, the plurality of electrodes to form a second cluster pattern comprising a plurality of second clusters, each second cluster comprising one or more electrodes from the primary first cluster and one or more electrodes from the secondary first cluster, the plurality of second clusters being non-interleaved;
applying voltage to each second cluster;
sensing each second cluster separately;
determining a plurality of second values, each second value associated with a capacitance of a respective second cluster; and
determining a position of an object relative to the touch sensor based at least on the plurality of first values and the plurality of second values.

18. The apparatus of claim 17, wherein:
each electrode of the plurality of electrodes is included in a respective first cluster and a respective second cluster;

the operations further comprise calculating representative values by calculating a representative value for each electrode of the plurality of electrodes based at least on the first value associated with the respective first cluster of the electrode and the second value associated with the respective second cluster of the electrode; and the determination of the position of the object is based at least on the representative values.

19. The apparatus of claim 17, wherein:

the operations further comprise:
configuring the plurality of electrodes to form a third cluster pattern comprising a plurality of third clusters, each third cluster comprising two or more electrodes from a primary second cluster and one or more electrodes from a secondary second cluster;
applying voltage to each third cluster; and
determining a plurality of third values, each third value associated with a capacitance of a respective third cluster; and
the determination of the position of the object is based further on the plurality of third values.

20. The apparatus of claim 19, wherein:
the plurality of electrodes comprises first, second, third, fourth, and fifth electrodes;
one of the first clusters comprises the first, second, and third electrodes;
one of the second clusters comprises the second, third, and fourth electrodes; and
one of the third clusters comprises the third, fourth, and fifth electrodes.

21. The apparatus of claim 17, wherein:
determining the plurality of first values comprises measuring a first voltage associated with each first cluster after the application of voltage to the first cluster; and
determining the plurality of second values comprises measuring a second voltage associated with each second cluster after the application of voltage to the second cluster.

22. The apparatus of claim 17, wherein each first cluster is at least partially interleaved with one or more adjacent first clusters.

23. A method comprising:
configuring a plurality of electrodes to form a first cluster pattern comprising a plurality of first clusters, each first cluster comprising two or more electrodes of the plurality of electrodes, a primary first cluster being interleaved with a secondary first cluster such that an electrode of the primary first cluster is positioned between first and second electrodes of the secondary first cluster;
applying voltage to each first cluster;
sensing each first cluster separately;
determining a plurality of first values, each first value associated with a capacitance of a respective first cluster;
configuring, in response to determining the plurality of first values, the plurality of electrodes to form a second cluster pattern comprising a plurality of second clusters, each second cluster comprising one or more electrodes from the primary first cluster and one or more electrodes from the secondary first cluster, the plurality of second clusters being non-interleaved;
applying voltage to each second cluster;
sensing each second cluster separately;
determining a plurality of second values, each second value associated with a capacitance of a respective second cluster; and
determining a position of an object relative to the touch sensor based at least on the plurality of first values and the plurality of second values.

24. The method of claim 23, wherein:
each electrode of the plurality of electrodes is included in a respective first cluster and a respective second cluster;
the method further comprises calculating representative values by calculating a representative value for each electrode of the plurality of electrodes based at least on the first value associated with the respective first cluster of the electrode and the second value associated with the respective second cluster of the electrode; and
the determination of the position of the object is based at least on the representative values.

25. The method of claim 23, wherein:
the method further comprises:
configuring the plurality of electrodes to form a third cluster pattern comprising a plurality of third clusters, each third cluster comprising two or more electrodes from a primary second cluster and one or more electrodes from a secondary second cluster;
applying voltage to each third cluster;
determining a plurality of third values, each third value associated with a capacitance of a respective third cluster; and
the determination of the position of the object is based further on the plurality of third values.

26. The method of claim 25, wherein:
the plurality of electrodes comprises first, second, third, fourth, and fifth electrodes;
one of the first clusters comprises the first, second, and third electrodes;
one of the second clusters comprises the second, third, and fourth electrodes; and
one of the third clusters comprises the third, fourth, and fifth electrodes.

27. The method of claim 23, wherein:
determining the plurality of first values comprises measuring a first voltage associated with each first clusters after the application of voltage to the first clusters; and
determining the plurality of second values comprises measuring a second voltage associated with each second clusters after the application of voltage to the second clusters.

28. The method of claim 23, wherein each first cluster is at least partially interleaved with one or more adjacent first clusters.

* * * * *